(12) United States Patent
Yanagida et al.

(10) Patent No.: US 10,056,788 B2
(45) Date of Patent: Aug. 21, 2018

(54) WIRELESS TRANSMISSION DEVICE

(71) Applicant: Yazaki Corporation, Tokyo (JP)

(72) Inventors: Yo Yanagida, Shizuoka (JP); Takahiro Nakahara, Shizuoka (JP); Antony Wambugu Ngahu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 175 days.

(21) Appl. No.: 15/337,589

(22) Filed: Oct. 28, 2016

(65) Prior Publication Data
US 2017/0149288 A1 May 25, 2017

(30) Foreign Application Priority Data

Nov. 20, 2015 (JP) ................. 2015-227364

(51) Int. Cl.
H02J 50/12 (2016.01)
H02J 50/90 (2016.01)

(52) U.S. Cl.
CPC .............. *H02J 50/12* (2016.02); *H02J 50/90* (2016.02)

(58) Field of Classification Search
CPC ..................................................... H02J 50/12
USPC .......................................................... 307/104
See application file for complete search history.

(56) References Cited

U.S. PATENT DOCUMENTS

| 8,847,432 | B2* | 9/2014 | Camurati | ............... | H02J 17/00 |
| | | | | | 307/104 |
| 2015/0333538 | A1* | 11/2015 | Kusunoki | ............... | H02J 17/00 |
| | | | | | 307/104 |
| 2016/0234890 | A1* | 8/2016 | De Samber | ........ | H05B 33/0806 |

FOREIGN PATENT DOCUMENTS

JP 9-182324 A 7/1997

* cited by examiner

*Primary Examiner* — Joseph Chang
(74) *Attorney, Agent, or Firm* — Kenealy Vaidya LLP

(57) ABSTRACT

A wireless transmission device includes a coil that generates a magnetic field, and a resonant power storage element module electrically connected with the coil, capable of accumulating electric power, and constitutes a resonance circuit corresponding to a power transmission frequency in cooperation with the coil when transmitting the electric power via the coil. The resonant power storage element module includes a substrate with which a first electric wire and a second electric wire larger in an amount of heat generation than the first electric wire at the time of energization are connected, and a plurality of power storage elements mounted on the substrate. A distance between the power storage elements adjacent to each other on a side of a connection portion connected with the second electric wire in the substrate is larger than that on a side of a connection portion connected with the first electric wire in the substrate.

4 Claims, 11 Drawing Sheets

WIRELESS TRANSMISSION DEVICE

CROSS-REFERENCE TO RELATED APPLICATION(S)

The present application claims priority to and incorporates by reference the entire contents of Japanese Patent Application No. 2015-227364 filed in Japan on Nov. 20, 2015.

BACKGROUND OF THE INVENTION

1. Field of the Invention

The present invention relates to a wireless transmission device.

2. Description of the Related Art

As a conventional wireless power supply system, for example, Japanese Patent Application Laid-open No. 9-182324 discloses a power system for a vehicle-use auxiliary electronic device, the power supply system being provided with a power source provided to a vehicle body, a power supply unit provided to a panel of the vehicle body and connected to the power source, a power reception unit that receives electric power from the power supply unit, and an auxiliary electronic device that operates with the electric power from the power reception unit. In the power supply system, the power supply unit is provided with a converter that converts the electric power from the power source into high frequency power, and a primary coil to which the high frequency power is supplied from the converter, the power reception unit is provided with a secondary coil that receives the high frequency power from the primary coil, and the power source of the auxiliary electronic device is capable of operating upon receiving the high frequency power from the secondary coil.

Here, there exists the case that the power supply system described in Japanese Patent Application Laid-open No. 9-182324 is, for example, provided with a resonant capacitor group that constitutes a resonant circuit in cooperation with a coil. In this case, when high power is applied to the resonant circuit, the heat resistance performance of the resonant capacitor group leaves much room for improvement.

SUMMARY OF THE INVENTION

The present invention has been made under such circumferences, and it is an object of the present invention to provide a wireless transmission device capable of improving the heat resistance performance thereof.

In order to achieve the above mentioned object, a wireless transmission device according to one aspect of the present invention includes a coil configured to generate a magnetic field; and a resonant power storage element module electrically connected with the coil, capable of accumulating electric power, and configured to constitute a resonance circuit corresponding to a power transmission frequency in cooperation with the coil when transmitting the electric power via the coil, wherein the resonant power storage element module includes a substrate with which a first electric wire and a second electric wire that is larger in an amount of heat generation than that of the first electric wire at a time of energization are connected, and a plurality of power storage elements mounted on the substrate, and a distance between the power storage elements adjacent to each other on a side of a connection portion connected with the second electric wire in the substrate is larger than that on a side of a connection portion connected with the first electric wire in the substrate.

According to another aspect of the present invention, in the wireless transmission device, it is possible to configure that the resonant power storage element module includes a region where the power storage elements are not mounted, in a center of the substrate.

According to still another aspect of the present invention, in the wireless transmission device, it is possible to configure that the resonant power storage element module mounts the power storage elements on a first mounting surface of the substrate and a second mounting surface on a back side of the first mounting surface, and the power storage elements on the first mounting surface and the power storage elements on the second mounting surface are arranged so as not to be overlapped with each other on both surfaces of the substrate.

According to still another aspect of the present invention, in the wireless transmission device, it is possible to further include a pillar arranged in the region where the power storage elements are not mounted in the substrate, and configured to reinforce a housing that accommodates the resonant power storage element module and the coil, wherein the pillar is composed of a material that is higher in thermal conductivity than that of the substrate.

The above and other objects, features, advantages and technical and industrial significance of this invention will be better understood by reading the following detailed description of presently preferred embodiments of the invention, when considered in connection with the accompanying drawings.

an amount of heat generation.

DETAILED DESCRIPTION OF THE PREFERRED EMBODIMENTS

Hereinafter, embodiments according to the present invention are specifically explained based on drawings. Here, the present invention is not limited to these embodiments. Furthermore, constitutional features in the following embodiments include a part that can easily be effected by those skilled in the art, or parts substantially identical with each other.

First Embodiment

Figure 1:
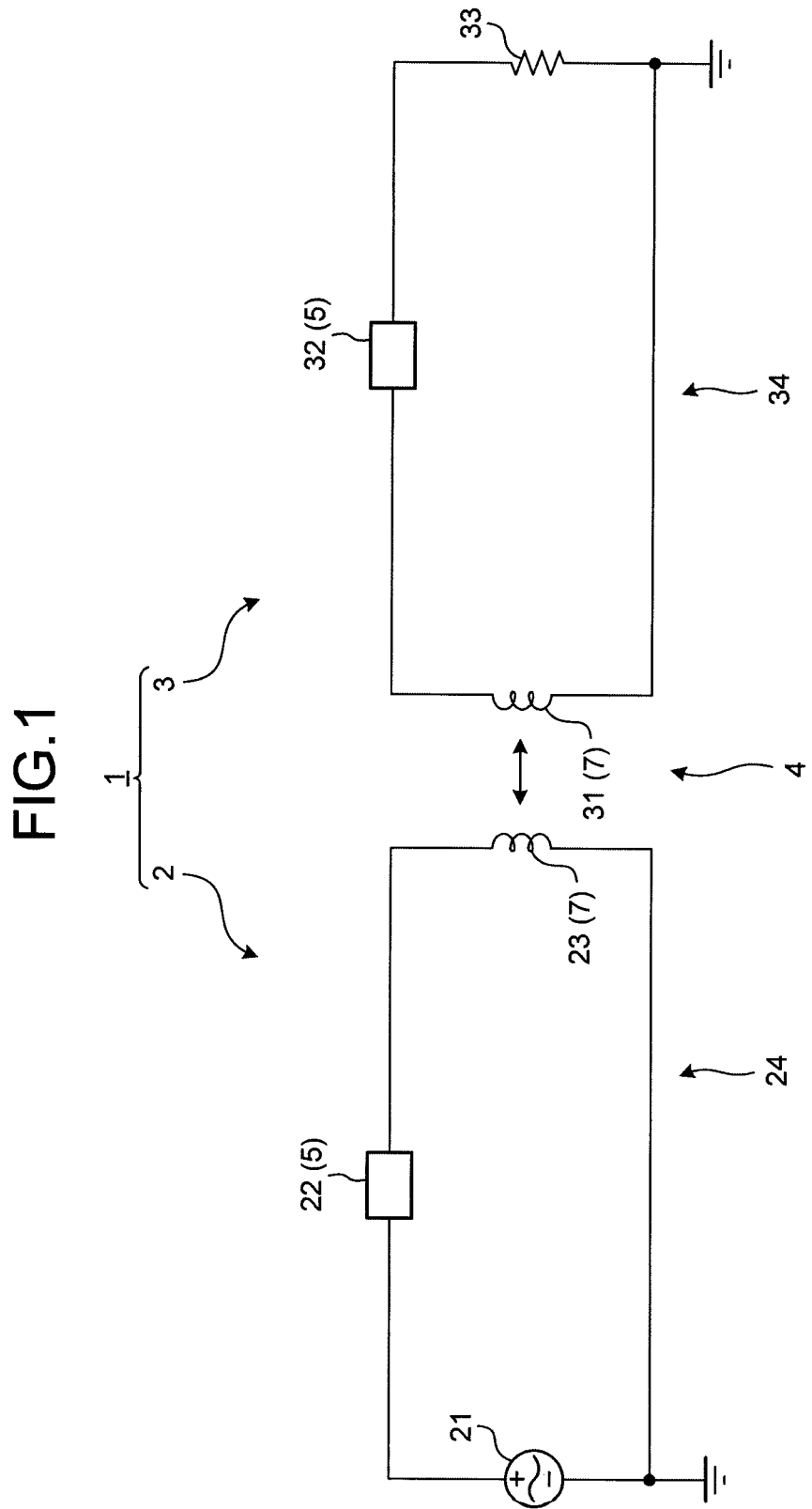
FIG. 1 is a block diagram illustrating a schematic structure of a wireless power supply system according to a first embodiment.
Figure 2:
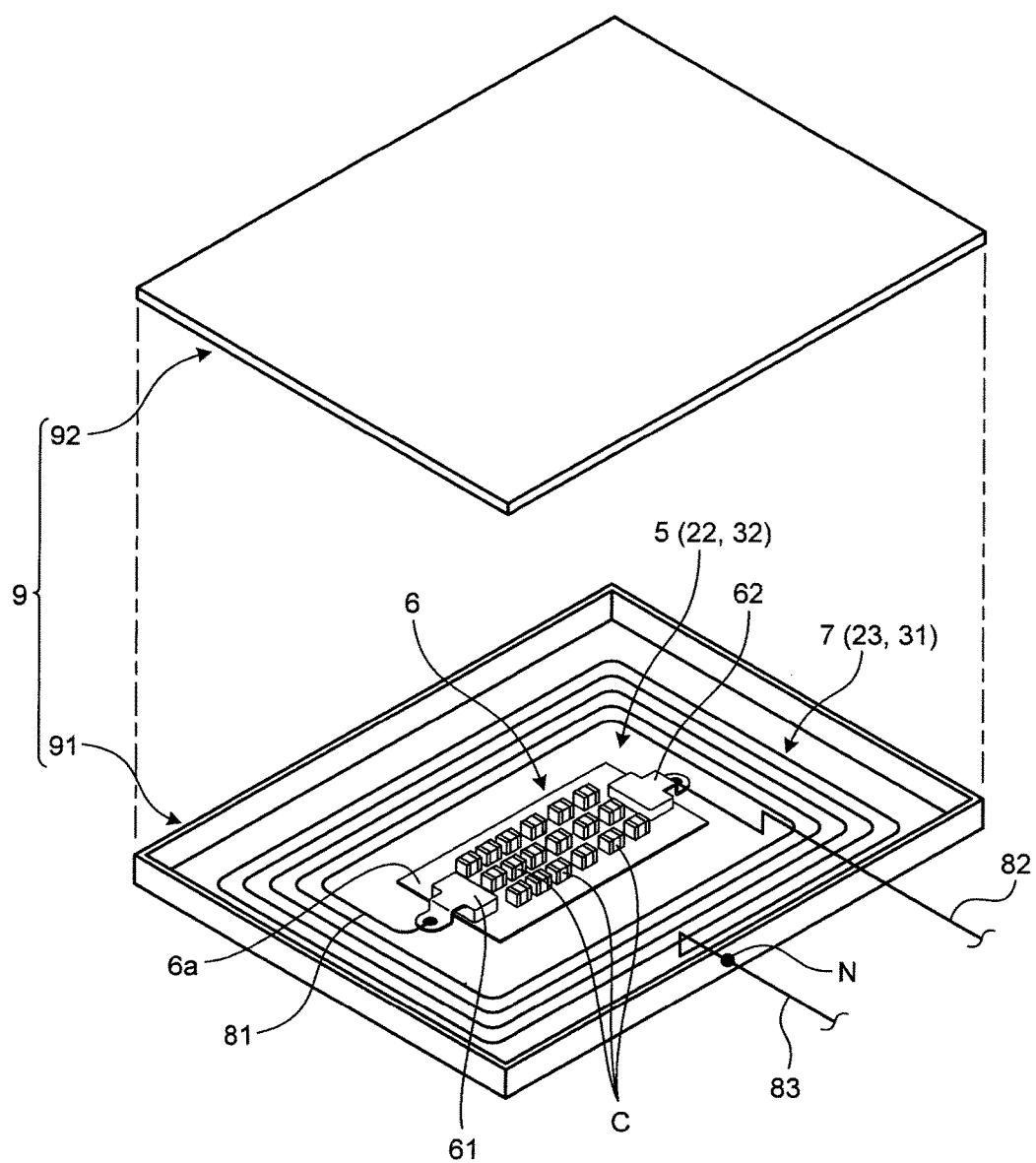
FIG. 2 is a schematic exploded perspective view illustrating a schematic structure of a resonant capacitor module of the wireless power supply system according to the first embodiment.
Figure 3:
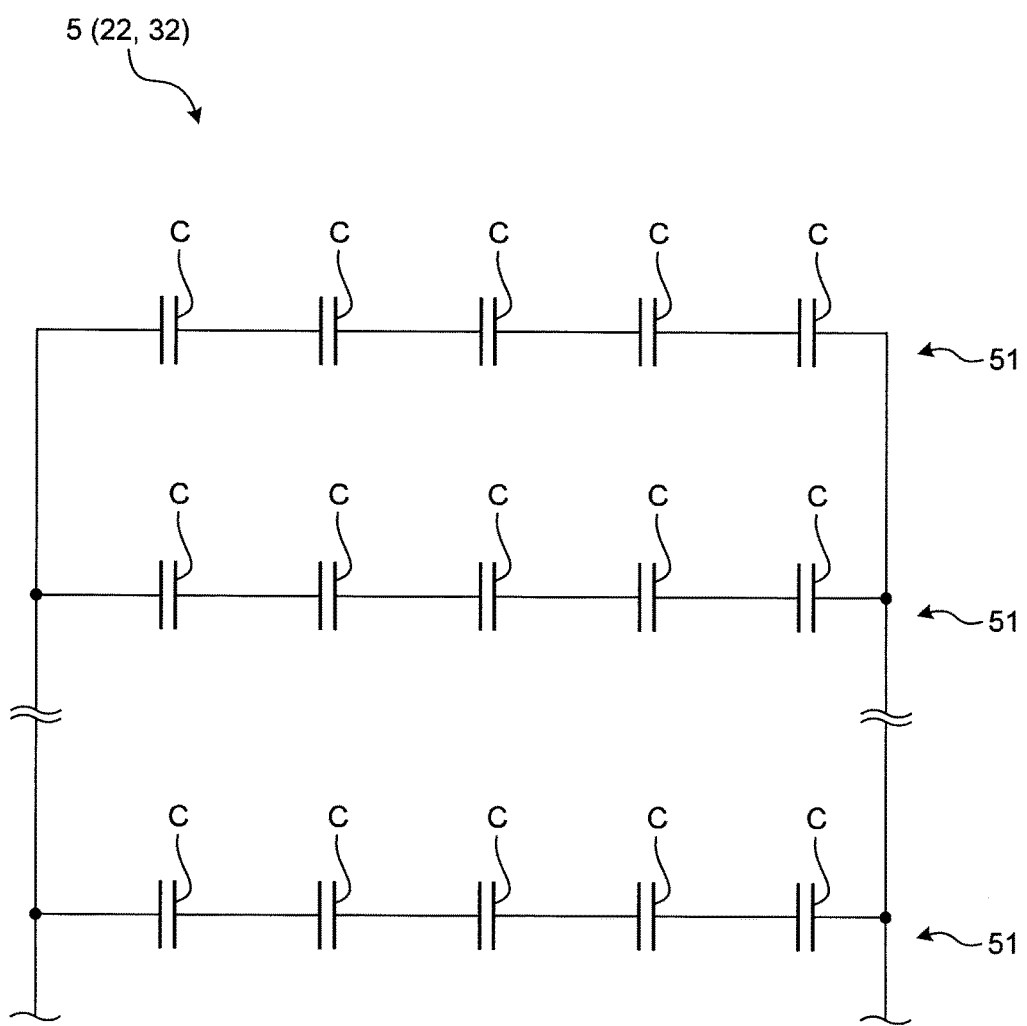
FIG. 3 is a schematic block diagram illustrating a schematic structure of the resonant capacitor module of the wireless power supply system according to the first embodiment.
Figure 4:
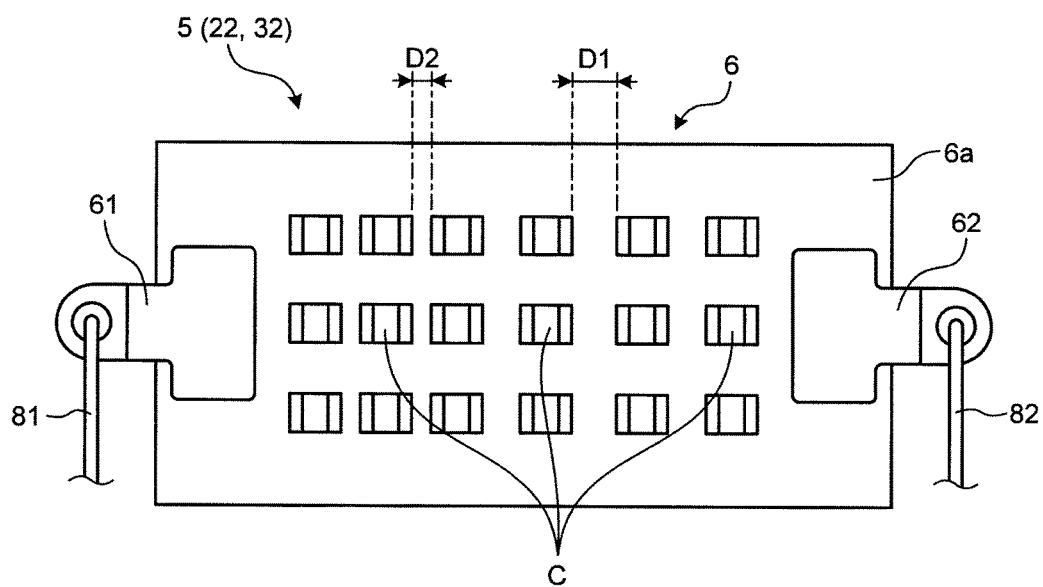
FIG. 4 is a schematic plan view illustrating a schematic structure of the resonant capacitor module of the wireless power supply system according to the first embodiment.
Figure 5:
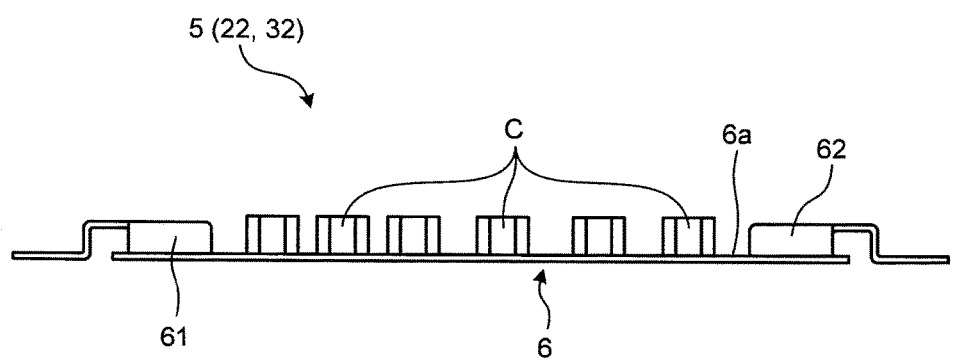
FIG. 5 is a side view illustrating the schematic structure of the resonant capacitor module of the wireless power supply system according to the first embodiment as viewed from a long side of the resonant capacitor module.
Figure 6:
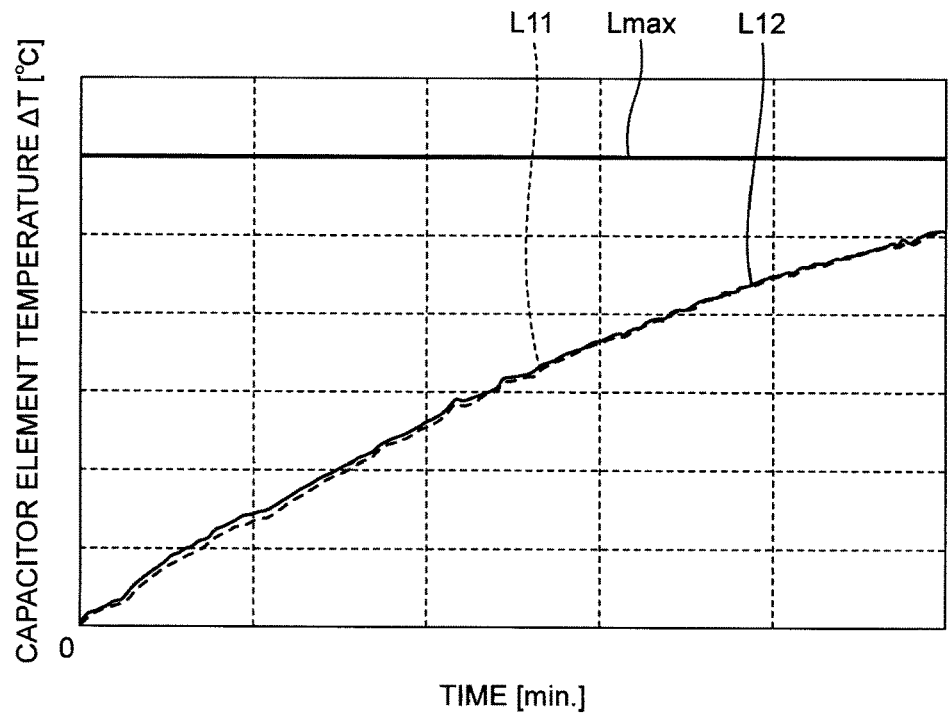
FIG. 6 is a diagram for explaining a heat resistance performance in the resonant capacitor module of the wireless power supply system according to the first embodiment.
Figure 7:
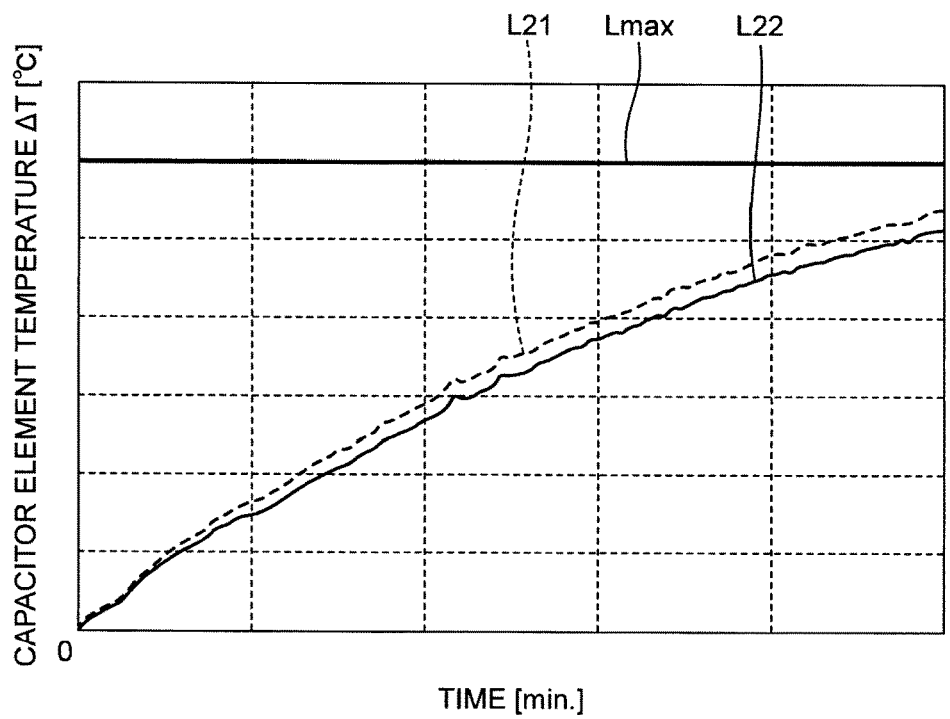
FIG. 7 is a diagram for explaining a heat resistance performance in the resonant capacitor module of the wireless power supply system according to the first embodiment.

FIG. 1 is a block diagram illustrating a schematic structure of a wireless power supply system according to a first embodiment. FIG. 2 is a schematic exploded perspective view illustrating a schematic structure of a resonant capacitor module of the wireless power supply system according to the first embodiment. FIG. 3 is a schematic block diagram illustrating a schematic structure of the resonant capacitor module of the wireless power supply system according to the first embodiment. FIG. 4 is a schematic plan view illustrating a schematic structure of the resonant capacitor module of the wireless power supply system according to the first embodiment. FIG. 5 is a side view illustrating the schematic structure of the resonant capacitor module of the wireless power supply system according to the first embodiment as viewed from a long side of the resonant capacitor module. Each of FIG. 6 and FIG. 7 is a diagram for explaining a heat resistance performance in the resonant capacitor module of the wireless power supply system according to the first embodiment.

A wireless power supply system 1, which is illustrated in FIG. 1, according to the present embodiment is a non-contact power supply system that transmits, when transmitting electric power from a power supply 21 to various kinds of electric loads 33, at least a part of the electric power by wireless. The wireless power supply system 1 of the present embodiment is, for example, provided to a vehicle or the like, and the electric loads 33 arranged in the inside of the vehicle are electrically and wirelessly connected with each other thus achieving non-contact power transmission.

To be more specific, the wireless power supply system 1 is provided with a power transmission device 2 as a wireless transmission device, and a power reception device 3 as a wireless transmission device.

The power transmission device 2 includes the power supply 21, a resonant capacitor module 22 as a resonant power storage element module, and a power transmission coil 23. The power supply 21 generates, for example, high-frequency power by a power source arranged outside a vehicle, and supplies the high-frequency power to the resonant capacitor module 22 and the power transmission coil 23. The resonant capacitor module 22 and the power transmission coil 23 are electrically connected to the power supply 21 in series. The resonant capacitor module 22 is electrically connected with the anode (plus side) of the power supply 21 at one of the terminals thereof, and electrically connected with one of the terminals of the power transmission coil 23 at the other terminal thereof. The power transmission coil 23 is electrically connected with the cathode (minus side) of the power supply 21 at the other terminal thereof. The power supply 21 is grounded at the cathode (minus side) thereof. The power transmission coil 23 generates a magnetic field. The resonant capacitor module 22 is electrically connected with the power transmission coil 23, and capable of accumulating electric power. The resonant capacitor module 22 constitutes, when transmitting electric power via the power transmission coil 23, a resonance circuit (LC resonance circuit) 24 corresponding to a predetermined power transmission frequency (resonant frequency) in cooperation with the power transmission coil 23. The resonance circuit 24 is capable of accumulating electric power oscillating at the power transmission frequency. Here, although the resonant capacitor module 22 is connected with the power transmission coil 23 in series, the resonant capacitor module 22 may be connected with the power transmission coil 23 in parallel. The constitution of the resonant capacitor module 22 is specifically explained later.

The power reception device 3 includes a power reception coil 31, a resonant capacitor module 32 as a resonant power storage element module, and the electric loads 33. The power reception coil 31, the resonant capacitor module 32, and each electric load 33 are electrically connected with each other in series. The power reception coil 31 is electrically connected with one of the terminals of the resonant capacitor module 32 at one of the terminals thereof. The resonant capacitor module 32 is electrically connected with one of the terminals of the electric load 33 at the other terminal thereof. The electric load 33 is electrically connected with the other terminal of the power reception coil 31 at the other terminal thereof. The respective electric loads 33 are various kinds of electrical equipments that consume electric power supplied from the wireless power supply system 1 to operate, and may be connected with each other in series or in parallel. The power reception coil 31 is grounded at the other terminal thereof. The power reception coil 31 generates a magnetic field. The resonant capacitor module 32 is electrically connected with the power reception coil 31, and capable of accumulating electric power. The resonant capacitor module 32 constitutes, when transmitting electric power via the power reception coil 31, a resonance circuit (LC resonance circuit) 34 corresponding to a predetermined power transmission frequency (resonant frequency) in cooperation with the power reception coil 31. The resonance circuit 34 is capable of accumulating electric power oscillating at the power transmission frequency. Here, although the resonant capacitor module 32 is connected with the power reception coil 31 in series, the resonant capacitor module 32 may be connected with the power reception coil 31 in parallel. The constitution of the resonant capacitor module 32 is specifically explained later.

The power transmission coil 23 of the power transmission device 2 transmits electric power supplied from the power supply 21 to the power reception coil 31. The power reception coil 31 of the power reception device 3 receives electric power from the power transmission coil 23 in a state that the power reception coil 31 is not in contact with the power transmission coil 23. Each of the power transmission coils 23 and the power reception coils 31 is, for example, constituted of a conductor coil formed in a vortex shape or in a spiral shape, and a pair of the power transmission coils 23 and the power reception coils 31 face each other in the axial direction thus constituting a non-contact power supply transformer 4. The non-contact power supply transformer 4 is capable of transmitting electric power from the power transmission coil 23 to the power reception coil 31 by an electromagnetic-field resonance method (magnetic field coupling method) or the like, in a state that the power reception coil 31 is not in contact with the power transmission coil 23. Here, the electromagnetic-field resonance method is a method for transmitting electric power by the following procedures; that is, an alternating current is allowed to flow into the power transmission coil 23, and thereby the power transmission coil 23 and the power reception coil 31 are resonated at a specific power transmission frequency thus transmitting electric power from the power transmission coil 23 to the power reception coil 31 through a resonance phenomenon of the electromagnetic field.

To be more specific, when the non-contact power supply transformer 4 transmits electric power from the power transmission coil 23 to the power reception coil 31, an alternating current of a high frequency corresponding to a power transmission frequency is supplied from the power supply 21 to the power transmission coil 23 in a state that the power transmission coil 23 and the power reception coil 31 are arranged to face each other in a spaced apart manner. In the non-contact power supply transformer 4, when the alternating current is supplied to the power transmission coil 23, the power transmission coil 23 and the power reception coil 31 are, for example, electromagnetically coupled to each other, and the electric power from the power transmission coil 23 is received by the power reception coil 31 with electromagnetic field resonance in a state that the power transmission coil 23 is not in contact with the power reception coil 31. The electric power received by the power reception coil 31 is utilized in the electric load 33. Here, in the wireless power supply system 1, a rectification smoothing circuit or the like may be interposed between the power reception coil 31 and the electric load 33.

Furthermore, the resonant capacitor modules 22 and 32 of the present embodiment has, as illustrated in FIG. 2, FIG. 3, FIG. 4, and FIG. 5, a substrate 6 and a plurality of capacitor elements C as a plurality of power storage elements to be mounted on the substrate 6, and the capacitor elements C are mounted on the substrate 6 in a predetermined array thus achieving enhancement in the heat resistance performance thereof.

Here, although there exists the case that the resonant capacitor module 22 and the resonant capacitor module 32 are, in a strict sense, different from each other in terms of the number and respective capacities of the capacitor elements C, the resonant capacitor module 22 and the resonant capacitor module 32 have respective constitutions substantially equivalent to each other, and are explained hereinafter as a common constitution accordingly. In the following explanation, when it is unnecessary to discriminate, in particular, between the resonant capacitor module 22 and the resonant capacitor module 32, they are merely referred to as "resonant capacitor module 5". Furthermore, when it is unnecessary to discriminate, in particular, between the power transmission coil 23 and the power reception coil 31, they are merely referred to as "coil 7".

The substrate 6 mounts, as illustrated in FIG. 2, the capacitor elements C thereon. The substrate 6 constitutes a circuit that electrically connects the capacitor elements C with each other. As the substrate 6, for example, what is called a printed circuit board (PCB) in which a circuit pattern (print pattern) is printed on the surface (mounting surface) of an insulated substrate composed of an insulative resin material with the use of a conductive material such as copper, a busbar composed of a conductive metallic material, a busbar plate in which the busbar is covered with the insulative resin material, or the like can be used. The substrate 6 of the present embodiment is formed in a rectangular plate shape, and one of the principal surfaces of the substrate 6 forms thereon a mounting surface 6a on which the capacitor elements C are mounted (see FIG. 5 also).

Furthermore, the substrate 6 connects thereto a litz wire 81 as a first electric wire and a stranded wire 82 as a second electric wire. The litz wire 81 that is relatively low in resistance in terms of a difference in cross-sectional shape or the like is an electric wire that is smaller in an amount of heat generation at the time of energization than the stranded wire 82. Here, the litz wire 81 is an electric wire that constitutes the coil 7. On the other hand, the stranded wire 82 that is relatively high in resistance in terms of a difference in cross-sectional shape or the like is an electric wire that is larger in an amount of heat generation at the time of energization than the litz wire 81. Here, the stranded wire 82 is an electric wire that electrically connects the substrate 6 and the power supply 21, or what is called a general electric wire such as an electric wire that electrically connects the substrate 6 and the electric load 33. The litz wire 81 is electrically connected with the substrate 6 via a connection terminal 61 whose one end is a connection portion. The stranded wire 82 is electrically connected with the substrate 6 via a connection terminal 62 whose one end is a connection portion. The connection terminal 61 and the connection terminal 62 are electrically connected to respective short sides of the substrate 6 formed in a rectangular plate shape, and face each other in an opposed manner along the long side direction.

Here, a resonant capacitor module 5 mounted on the substrate 6, and the coil 7 are accommodated together in a housing 9 formed in an approximately rectangular parallelepiped box shape, the housing 9 being constituted of a coil case 91 and a lid 92. In the housing 9, the resonant capacitor module 5 is arranged in the vicinity of the central area of the coil 7. An end portion of each of the litz wire 81 and the stranded wire 82 is extended from the housing 9 and electrically connected to each corresponding part, the end portion being opposite to another end portion connected to each of the connection terminals 61 and 62. Here, the litz wire 81 is electrically connected with a stranded wire 83 via a node N, and the stranded wire 83 is electrically connected to each corresponding part.

The capacitor elements C are mounted on the mounting surface 6a of the substrate 6. Each of the capacitor elements C may be what is called a ceramic capacitor or a film capacitor. The capacitor elements C of the present embodiment are mounted on the substrate 6 in a state that the capacitor elements C are connected with each other alternately in series and in parallel to constitute an element array so that the capacitor elements C withstand a large current and a large voltage. Here, as one example, the resonant capacitor module 5 is, as illustrated in FIG. 3, constituted so that the capacitor elements C are connected to each other in series to constitute a plurality of series groups 51, and the plurality of series groups 51 are connected to each other in parallel.

Furthermore, in the resonant capacitor module 5 of the present embodiment, the capacitor elements C are, as illustrated in FIG. 4 and FIG. 5, arranged on the mounting surface 6a of the substrate 6 so that a distance between the capacitor elements C adjacent to each other on the side of the connection terminal 62 connected with the stranded wire 82 in the substrate 6 is larger than that on the side of the connection terminal 61 connected with the litz wire 81 in the substrate 6.

In this case, six capacitor elements C are aligned in the long side direction of the substrate 6, three capacitor elements C are aligned in the short side direction of the substrate 6, and eighteen capacitor elements C are consequently mounted on the mounting surface 6a in total. Furthermore, in the resonant capacitor module 5, a distance D1 between two capacitor elements C adjacent to each other along the long side direction in nine capacitor elements C arranged on the connection terminal 62 side of the substrate 6 out of the plurality of capacitor elements C is set larger than a distance D2 between two capacitor elements C adjacent to each other along the long side direction in remaining nine capacitor elements C arranged on the connection terminal 61 side of the substrate 6 out of the plurality of capacitor elements C. Here, although the plurality of capacitor elements C are, as illustrated in FIG. 4, arranged so that a distance between two capacitor elements C adjacent to each other along the short side direction is constant, a distance between two capacitor elements C adjacent to each other along the short side direction in nine capacitor elements C arranged on the connection terminal 62 side of the substrate 6 may be, in the same manner as the case of the distances D1 and D2, set larger than a distance between two capacitor elements C adjacent to each other along the short side direction in remaining nine capacitor elements C arranged on the connection terminal 61 side of the substrate 6.

According to the power transmission device 2 and the power reception device 3 that are explained heretofore, the power transmission device 2 is provided with the power transmission coil 23 that generates a magnetic field, and the resonant capacitor modules 22 that is electrically connected with the power transmission coil 23, capable of accumulating electric power, and constitutes the resonance circuits 24 corresponding to a power transmission frequency in cooperation with the power transmission coil 23 when transmitting electric power via the power transmission coil 23; and the power reception device 3 is provided with the power reception coil 31 that generates a magnetic field, and the resonant capacitor modules 32 that is electrically connected with the power reception coil 31, capable of accumulating electric power, and constitutes the resonance circuits 34 corresponding to a power transmission frequency in cooperation with the power reception coil 31 when transmitting electric power via the power reception coil 31. Each of the resonant capacitor modules 22 and 32 has the substrate 6 to which the litz wire 81 and the stranded wire 82 that is larger in an amount of heat generation at the time of energization than the litz wire 81, and the plurality of capacitor elements C mounted on the substrate 6. A distance between the capacitor elements C adjacent to each other on the side of the connection terminal 62 connected with the stranded wire 82 in the substrate 6 is set larger than that on the side of the connection terminal 61 connected with the litz wire 81 in the substrate 6.

Accordingly, in the substrate 6 that constitutes each of the resonant capacitor modules 22 and 32 used in the power transmission device 2 and the power reception device 3 respectively, the distance D1 between the capacitor elements C adjacent to each other on the side of the connection terminal 62 connected with the stranded wire 82 that is relatively large in an amount of heat generation can be set larger thus suppressing heat accumulation generated on the side of the connection terminal 62 connected with the stranded wire 82. That is, in the resonant capacitor modules 22 and 32, a difference in an amount of heat generation of the electric wire (litz wire 81, stranded wire 82) connected to the substrate 6 causes a temperature difference in the temperature distribution on the substrate 6. In this case, in the resonant capacitor modules 22 and 32, the distance D1 between the capacitor elements C adjacent to each other on the side of the connection terminal 62 connected with the stranded wire 82 that is relatively large in an amount of heat generation is set relatively larger, the arrangement density of the capacitor elements C on the connection terminal 62 side of the substrate 6 is thereby reduced, and a relatively large space for dissipating heat from the substrate 6 and the capacitor element C is ensured thus easily dissipating heat from the substrate 6 and the capacitor element C on the connection terminal 62 side of the substrate 6. Consequently, the resonant capacitor modules 22 and 32 are capable of suppressing the heat accumulation around the capacitor element C on the side of the connection terminal 62 connected with the stranded wire 82 that is relatively large in an amount of heat generation. As a result, the power transmission device 2 and the power reception device 3 are capable of reducing heat that acts on the capacitor element C that is low in heat resistance performance thus relatively suppressing, as illustrated in FIG. 6 and FIG. 7, the temperature rise of the capacitor element C.

Here, FIG. 6 illustrates the temperature change of the capacitor element C with time on the side of the connection terminal 61 connected with the litz wire 81, and FIG. 7 illustrates the temperature change of the capacitor element C with time on the side of the connection terminal 62 connected with the stranded wire 82. In FIG. 6 and FIG. 7, a time (minute) is taken on an axis of abscissa, and a capacitor element temperature $\Delta T$ (° C.) is taken on an axis of ordinate. In FIG. 6 and FIG. 7, a line Lmax indicates the heat resistant temperature of the capacitor element C, lines L11 and L21 indicate temperatures of respective capacitor elements C in a resonant capacitor module according to an comparative example in which a distance between the capacitor elements C adjacent to each other is constant, and lines L12 and L22 indicate temperatures of the respective capacitor elements C in the resonant capacitor modules 22 and 32 according to the present embodiment. As illustrated in FIG. 6, the temperature (line L12) of the capacitor element C according to the comparative example is substantially equivalent to the temperature (line L11) of the capacitor element C according to the present embodiment, and it is evident that the capacitor element C on the side of the connection terminal 61 connected with the litz wire 81 is hardly influenced by the heat from the side of the connection terminal 62 connected with the stranded wire 82. Furthermore, as illustrated in FIG. 7, in respect to the capacitor element C on the side of the connection terminal 62 connected with the stranded wire 82, it is evident that the temperature (line L22) of the capacitor element C according to the present embodiment is lowered compared with the temperature (line L21) of the capacitor element C according to the comparative example. In this manner, the power transmission device 2 and the power reception device 3 are capable of suppressing the temperature rise of a capacitor element C relatively low in heat resistance performance; in particular, the temperature rise of the capacitor element C on the side of the connection terminal 62 connected with the stranded wire 82 that is relatively large in an amount of heat generation. As a result, it is possible to improve the heat resistance performance of each of the power transmission device 2 and the power reception device 3.

Second Embodiment

Figure 8:
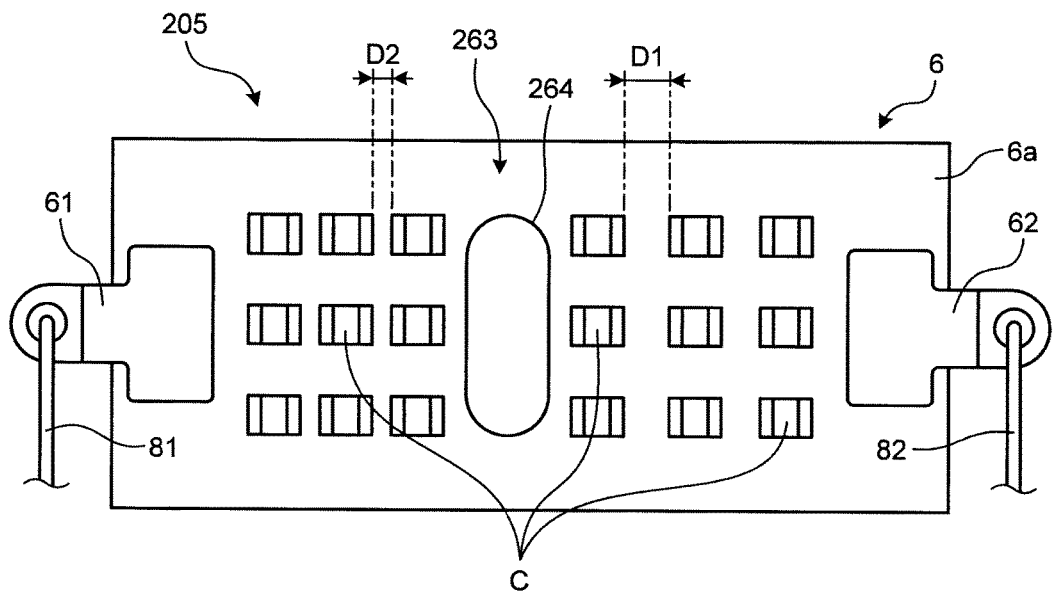
FIG. 8 is a schematic plan view illustrating a schematic structure of a resonant capacitor module of a wireless power supply system according to a second embodiment.
Figure 9:
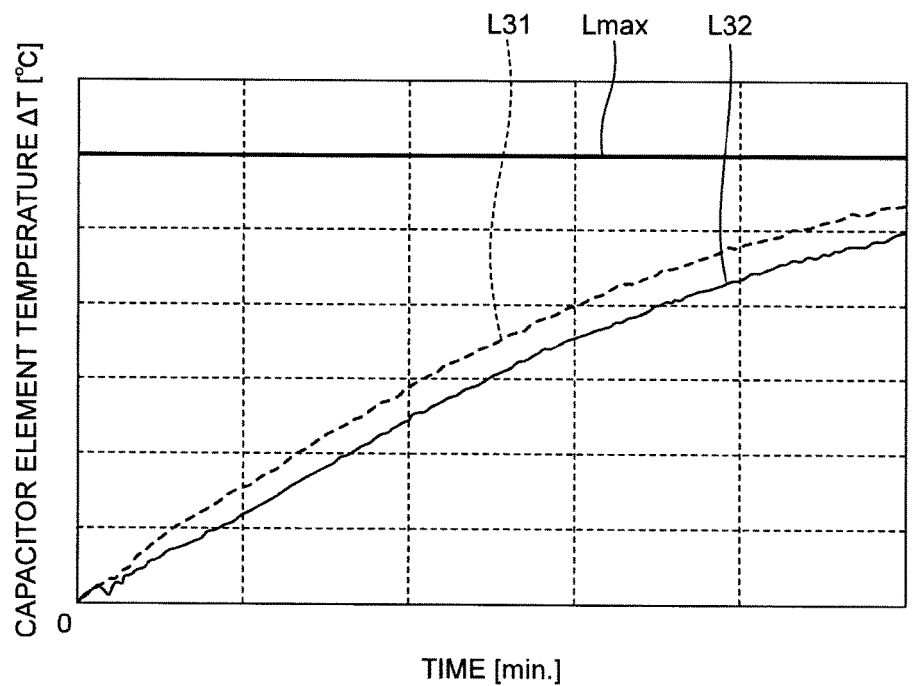
FIG. 9 is a diagram for explaining a heat resistance performance in the resonant capacitor module of the wireless power supply system according to the second embodiment.

FIG. 8 is a schematic plan view illustrating a schematic structure of a resonant capacitor module of a wireless power supply system according to a second embodiment. FIG. 9 is a diagram for explaining a heat resistance performance in the resonant capacitor module of the wireless power supply system according to the second embodiment. The wireless transmission device according to the second embodiment is different in arrangement of power storage elements on a substrate from the wireless transmission device according to the first embodiment. Furthermore, in respect to constitutions, operations, and advantageous effects that are identical with those in the above-mentioned embodiment, their repeated explanations are omitted as much as possible. In addition, see FIG. 1, FIG. 2, or other drawings, as needed, for the constitutions identical with those in the first embodiment (in the similar manner as above, hereinafter).

Each of the power transmission device 2 (see FIG. 1 or other drawings) and the power reception device 3 (see FIG. 1 or other drawings) as the wireless transmission device according to the present embodiment is provided with a resonant capacitor module 205 as a resonant power storage element module illustrated in FIG. 8 in place of the resonant capacitor modules 5, 22, and 32 (see FIG. 1 or other drawings). Here, in the same manner as above, the explanation is made assuming that the resonant capacitor module 205 is a common constitutional feature in the power transmission device 2 and the power reception device 3.

The resonant capacitor module 205 has, in the same manner as the resonant capacitor module 5 (see FIG. 4), a substrate 6 to which a litz wire 81 and a stranded wire 82 that is larger in an amount of heat generation than the litz wire 81 at the time of energization are connected, and a plurality of capacitor elements C mounted on the substrate 6. A distance between the capacitor elements C adjacent to each other on the side of the connection terminal 62 connected with the stranded wire 82 in the substrate 6 is set larger than that on the side of the connection terminal 61 connected with the litz wire 81 in the substrate 6.

Furthermore, the resonant capacitor module 205 of the present embodiment further has a margin region 263 on which the capacitor elements C are not mounted, the margin region 263 being located in a central area of the substrate 6. The central area of the substrate 6, the central area in which the margin region 263 is located, is typically a region located in between the connection terminal 61 connected with the litz wire 81 in the substrate 6 and the connection terminal 62 connected with the stranded wire 82 in the substrate 6; that is, an area in the middle of the substrate 6, which is formed in a rectangular plate shape, in the long side direction. To be more specific, the margin region 263 is formed in between nine capacitor elements C located on the connection terminal 62 side of the substrate 6, in which each two capacitor elements C out of nine capacitor elements C are adjacent to each other in a spaced apart manner with a distance D1 in the long side direction, and nine capacitor elements C on the connection terminal 61 side of the substrate 6, in which each two capacitor elements C out of nine capacitor elements C are adjacent to each other in a spaced apart manner with a distance D2 in the long side direction. The margin region 263 is formed as a region larger in width than the distance D1 in the long side direction.

In the power transmission device 2 and the power reception device 3 that are explained heretofore, the distance D1 between the capacitor elements C adjacent to each other on the side of the connection terminal 62 connected with the stranded wire 82 that is relatively large in an amount of heat generation in the substrate 6 that constitutes the resonant capacitor module 205 can be increased thus suppressing heat accumulation on the side of the connection terminal 62 connected with the stranded wire 82. As a result, it is possible to improve the heat resistance performance of each of the power transmission device 2 and the power reception device 3.

Furthermore, according to the power transmission device 2 and the power reception device 3 that are explained heretofore, the resonant capacitor module 205 has the margin region 263 on which the capacitor elements C are not mounted, the margin region 263 being located in the center of the substrate 6. That is, in the power transmission device 2 and the power reception device 3, the margin region 263 on which the capacitor elements C are not mounted is daringly formed in the center of the substrate 6, and thereby the arrangement density of the capacitor elements C in the central area of the substrate 6, the central area in which heat is easily accumulated, is reduced, and the margin region 263 ensures a relatively large space for dissipating heat from the substrate 6 and the capacitor element C thus easily dissipating the heat from the substrate 6 and the capacitor element C in the central area of the substrate 6. Consequently, the resonant capacitor module 205 is capable of suppressing heat accumulation in the central area of the substrate 6, and further suppressing, as illustrated in FIG. 9, the temperature rise of the capacitor element C relatively low in heat resistance performance.

Here, FIG. 9 illustrates the temperature change of the capacitor element C with time in the present embodiment. In FIG. 9, a time (minute) is taken on an axis of abscissa, and a capacitor element temperature $\Delta T$ (° C.) is taken on an axis of ordinate. In FIG. 9, the line Lmax indicates the heat resistant temperature of the capacitor element C, a line L31 indicates the temperature of the capacitor element C in the resonant capacitor module according to the comparative example in which the margin region 263 is not provided to the resonant capacitor module, and a line L32 indicates the temperature of the capacitor element C in the resonant capacitor module 205 according to the present embodiment. As illustrated in FIG. 9, it is evident that the temperature (line L32) of the capacitor element C according to the present embodiment is lowered compared with the temperature (line L31) of the capacitor element C according to the comparative example. In this manner, each of the power transmission device 2 and the power reception device 3 is provided with the margin region 263 arranged in the center of the substrate 6 thus further suppressing the temperature rise of the capacitor element C. As a result, it is possible to further improve the heat resistance performance of the resonant capacitor module. Furthermore, as illustrated in FIG. 8, each of the power transmission device 2 and the power reception device 3 may form, for example, a pillar 264 for reinforcing the housing 9 in the margin region 263 thereof, the pillar 264 being composed of a material excellent in thermal conductivity. That is, each of the power transmission device 2 and the power reception device 3 may be provided with the pillar 264 that is arranged in the margin region 263 and reinforces the housing 9 that accommodates the resonant capacitor module 205 and the coil 7, the margin region 263 being a region on which the capacitor elements C are not mounted in the substrate 6, the pillar 264 being composed of a material that is higher in thermal conductivity than the substrate 6. Due to such a constitution, each of the power transmission device 2 and the power reception device 3 is capable of further suppressing heat accumulation in the central area of the substrate 6.

Third Embodiment

Figure 10:
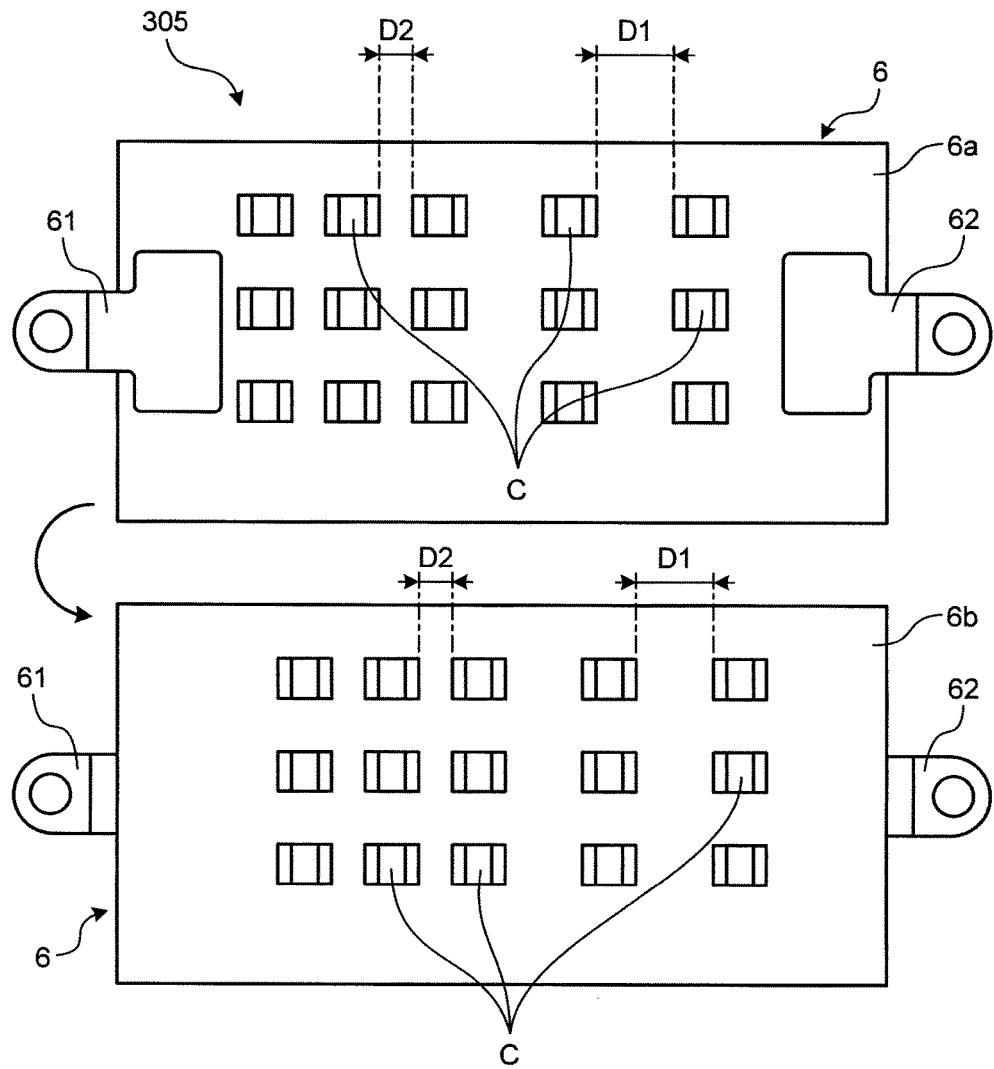
FIG. 10 is a schematic view illustrating schematically both surfaces of a substrate of a resonant capacitor module of a wireless power supply system according to a third embodiment.
Figure 11:
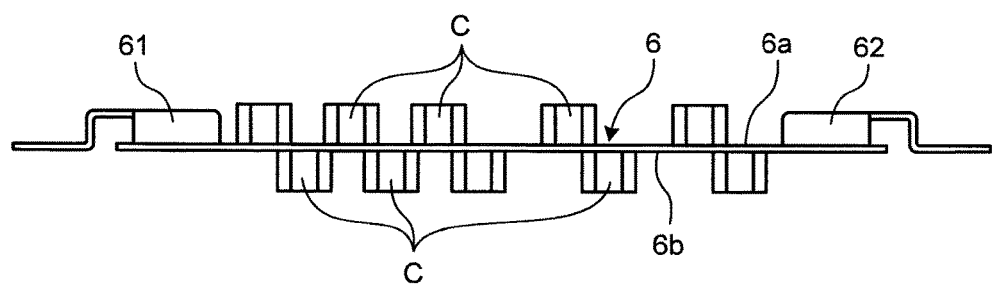
FIG. 11 is a side view illustrating the schematic structure of the resonant capacitor module of the wireless power supply system according to the third embodiment as viewed from a long side of the resonant capacitor module.
Figure 12:
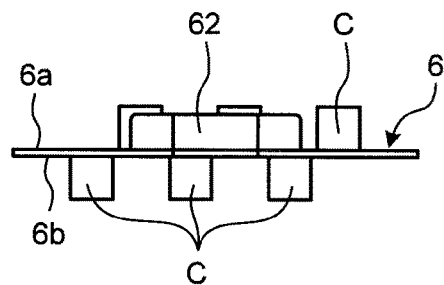
FIG. 12 is a side view illustrating the schematic structure of the resonant capacitor module of the wireless power supply system according to the third embodiment as viewed from a short side of the resonant capacitor module.
Figure 13:
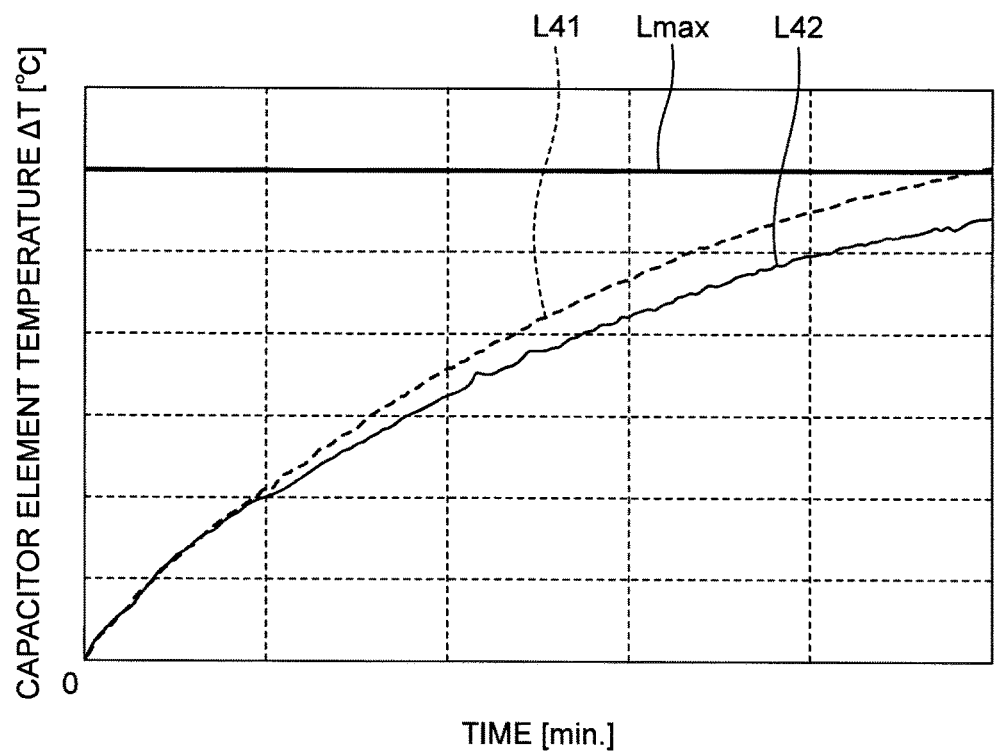
FIG. 13 is a diagram for explaining a heat resistance performance in the resonant capacitor module of the wireless power supply system according to the third embodiment.

FIG. 10 is a schematic view illustrating schematically both surfaces of the substrate of a resonant capacitor module of a wireless power supply system according to a third embodiment. FIG. 11 is a side view illustrating the schematic structure of the resonant capacitor module of the wireless power supply system according to the third embodiment as viewed from a long side of the resonant capacitor module. FIG. 12 is a side view illustrating the schematic structure of the resonant capacitor module of the wireless power supply system according to the third embodiment as viewed from a short side of the resonant capacitor module. FIG. 13 is a diagram for explaining a heat resistance performance in the resonant capacitor module of the wireless power supply system according to the third embodiment. The wireless transmission device according to the third embodiment is different in arrangement of power storage elements on the substrate from the wireless transmission device according to the first embodiment.

Each of the power transmission device 2 (see FIG. 1 or other drawings) and the power reception device 3 (see FIG. 1 or other drawings) as an wireless transmission device according to the present embodiment is provided with a resonant capacitor module 305 as a resonant power storage element module illustrated in FIG. 10, FIG. 11, and FIG. 12 in place of the resonant capacitor modules 5, 22, and 32 (see FIG. 1 or other drawings). Here, in the same manner as above, the explanation is made assuming that the resonant capacitor module 305 is a common constitutional feature in the power transmission device 2 and the power reception device 3.

The resonant capacitor module 305 has, in the same manner as the resonant capacitor module 5 (see FIG. 4), a substrate 6 to which a litz wire 81 and a stranded wire 82 that is larger in an amount of heat generation than the litz wire 81 at the time of energization are connected, and a plurality of capacitor elements C mounted on the substrate 6. A distance between the capacitor elements C adjacent to each other on the side of the connection terminal 62 connected with the stranded wire 82 in the substrate 6 is set larger than that on the side of the connection terminal 61 connected with the litz wire 81 in the substrate 6.

In the resonant capacitor module 305 according to the present embodiment, respective principal surfaces on both surfaces of the substrate 6 constitute the first mounting surface 6a and a second mounting surface 6b. Furthermore, in the resonant capacitor module 305, the capacitor elements C are mounted on the first mounting surface 6a of the substrate 6 and the second mounting surface 6b on the back side of the first mounting surface 6a, and arranged so that the mounting position of each capacitor element C in the first mounting surface 6a is different from the mounting position of each capacitor element C in the second mounting surface 6b. That is, the capacitor element C in the first mounting surface 6a and the capacitor element C in the second mounting surface 6b are arranged so as not to face each other in an opposed manner on both surfaces of the substrate 6; namely, so as not to be located in a back-to-back manner; further namely, so as not to be overlapped with each other on both surfaces of the substrate 6. In the resonant capacitor module 305 according to the present embodiment, the capacitor element C in the first mounting surface 6a and the capacitor element C in the second mounting surface 6b are arranged in an alternately offset manner in the short side direction and the long side direction of the substrate 6 on both surfaces of the substrate 6, and thereby the capacitor element C in the first mounting surface 6a and the capacitor element C in the second mounting surface 6b are arranged so as to be different in mounting position from each other and so as not to be overlapped with each other on both surfaces of the substrate 6.

Each of the power transmission device 2 and the power reception device 3 that are explained heretofore is capable of increasing, in the substrate 6 that constitutes the resonant capacitor module 305, the distance D1 of the capacitor elements C adjacent to each other on the side of the connection terminal 62 connected with the stranded wire 82 that is relatively large in an amount of heat generation thus suppressing heat accumulation on the side of the connection terminal 62 connected with the stranded wire 82. As a result, it is possible to improve the heat resistance performance of the resonant capacitor module 305.

According to the power transmission device 2 and the power reception device 3 that are explained heretofore, in the resonant capacitor module 305, the capacitor elements C are mounted on the first mounting surface 6a of the substrate 6 and the second mounting surface 6b on the back side of the first mounting surface 6a, and the capacitor element C in the first mounting surface 6a and the capacitor element C in the second mounting surface 6b are arranged so as not to be overlapped with each other on both surfaces of the substrate 6. Accordingly, in the power transmission device 2 and the power reception device 3, the capacitor elements C are mounted on the substrate 6 so as not to be overlapped with each other on both surfaces of the substrate 6 thus ensuring the space on the back side of each capacitor element C as a space for dissipating heat, and ensuring the heat dissipation of each capacitor element C. As a result, each of the power transmission device 2 and the power reception device 3 is capable of suppressing the heat accumulation thereof, and as illustrated in FIG. 13, it is possible to further suppress the temperature rise of the capacitor element C that is relatively low in heat resistance performance.

Here, FIG. 13 illustrates the temperature change of the capacitor element C with time in the present embodiment. In FIG. 13, a time (minute) is taken on an axis of abscissa, and a capacitor element temperature $\Delta T$ (° C.) is taken on an axis of ordinate. In FIG. 13, the line Lmax indicates the heat resistant temperature of the capacitor element C, a line L41 indicates the temperature of the capacitor element C in the resonant capacitor module according to the comparative example in which the capacitor element C in the first mounting surface 6a and the capacitor element C in the second mounting surface 6b are arranged so as to be overlapped with each other on both surfaces of the substrate 6, and a line L42 indicates the temperature of the capacitor element C in the resonant capacitor module 305 according to the present embodiment. As illustrated in FIG. 13, it is evident that the temperature (line L42) of the capacitor element C according to the present embodiment is lowered compared with the temperature (line L41) of the capacitor element C according to the comparative example. In this manner, in the power transmission device 2 and the power reception device 3, the capacitor element C in the first mounting surface 6a and the capacitor element C in the second mounting surface 6b are arranged so as not to be overlapped with each other on both surfaces of the substrate 6 thus further suppressing the temperature rise of the capacitor element C. As a result, it is possible to further improve the heat resistance performance of each of the power transmission device 2 and the power reception device 3.

A constitution such that the capacitor elements C are not overlapped with each other on both surfaces of the substrate 6 is not limited to the above-mentioned constitution.

Figure 14:
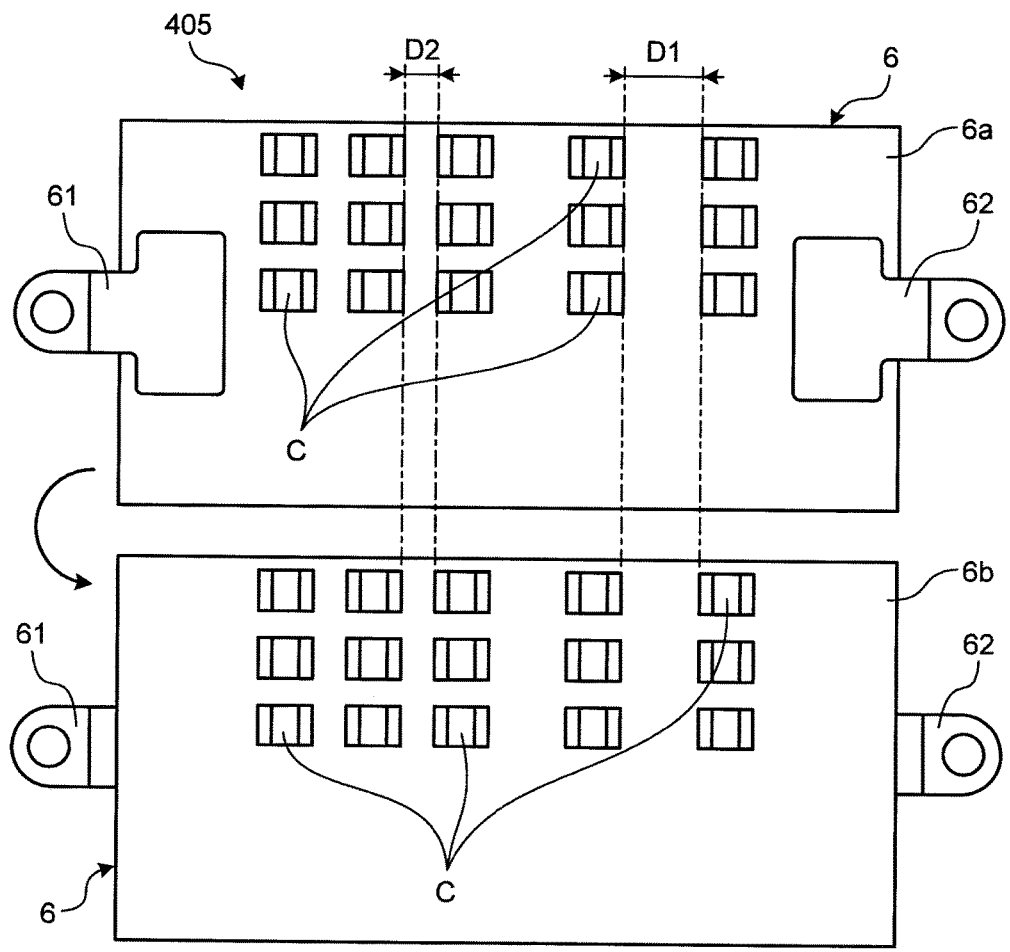
FIG. 14 is a schematic view illustrating schematically both surfaces of a substrate of a resonant capacitor module of a wireless power supply system according to a modification.
Figure 15:
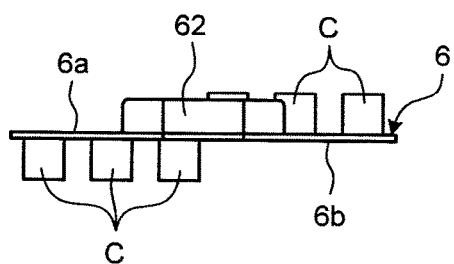
FIG. 15 is a side view illustrating the schematic structure of the resonant capacitor module of the wireless power supply system according to the modification as viewed from a short side of the resonant capacitor module.

In a resonant capacitor module 405 according to a modification illustrated in FIG. 14 and FIG. 15, in the same manner as the resonant capacitor module 305, the capacitor element C in the first mounting surface 6a and the capacitor element C in the second mounting surface 6b are arranged so as not to be overlapped with each other on both surfaces of the substrate 6. In the resonant capacitor module 405 according to the present modification, the capacitor elements C in the first mounting surface 6a and the capacitor elements C in the second mounting surface 6b are arranged so as to be overall displaced each other in the short side direction of the substrate 6 on both surfaces of the substrate 6 and hence, the capacitor element C in the first mounting surface 6a and the capacitor element C in the second mounting surface 6b are arranged so as to be different in mounting position from each other and so as not to be overlapped with each other on both surfaces of the substrate 6.

Figure 16:
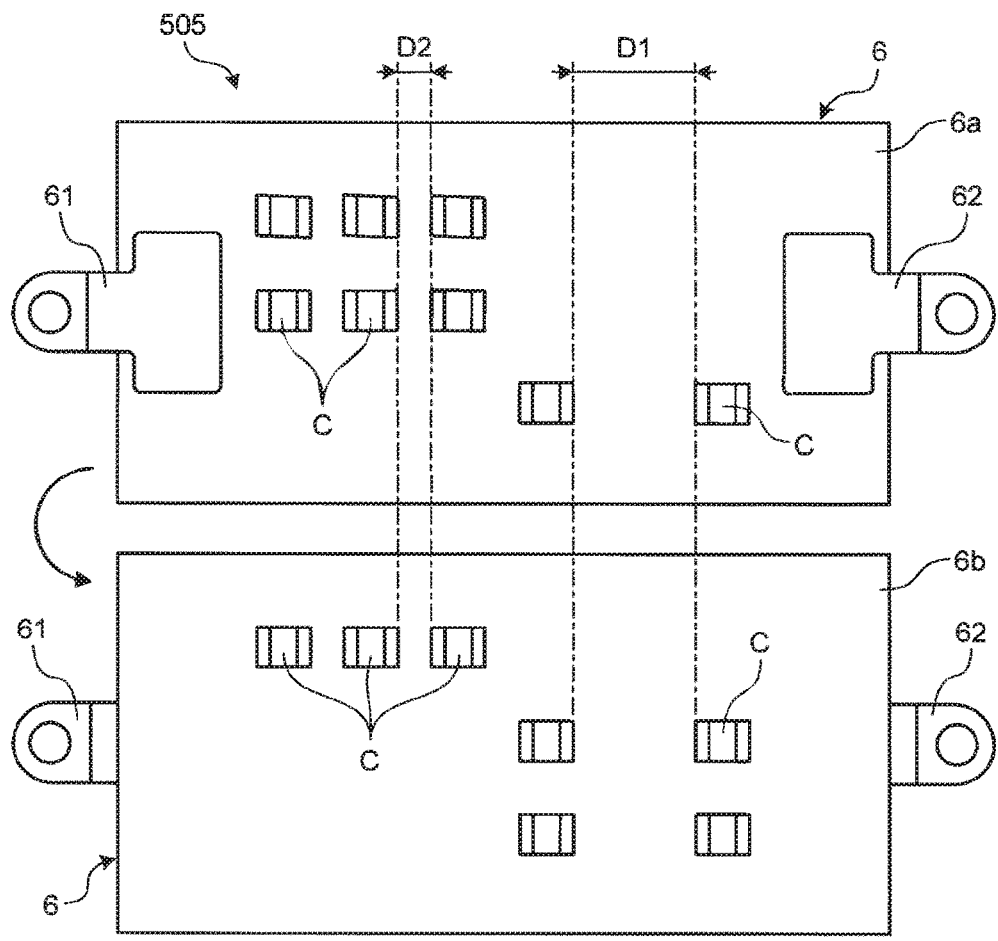
FIG. 16 is a schematic view illustrating schematically both surfaces of a substrate of a resonant capacitor module of a wireless power supply system according to a modification.

In a resonant capacitor module 505 according to a modification illustrated in FIG. 16, in the same manner as the resonant capacitor modules 305 and 405, the capacitor element C in the first mounting surface 6a and the capacitor element C in the second mounting surface 6b are arranged so as not to be overlapped with each other on both surfaces of the substrate 6. In the resonant capacitor module 505 according to the present modification, the capacitor elements C in the first mounting surface 6a and the capacitor elements C in the second mounting surface 6b are arranged so as to be interrelated such that, in a position in which the capacitor elements C are arranged on one surface of the substrate 6, the number of the capacitor elements C to be arranged on the other surface of the substrate 6 is reduced and hence, the capacitor element C in the first mounting surface 6a and the capacitor element C in the second mounting surface 6b are arranged so as to be different in mounting position from each other and so as not to be overlapped with each other on both surfaces of the substrate 6.

Figure 17:
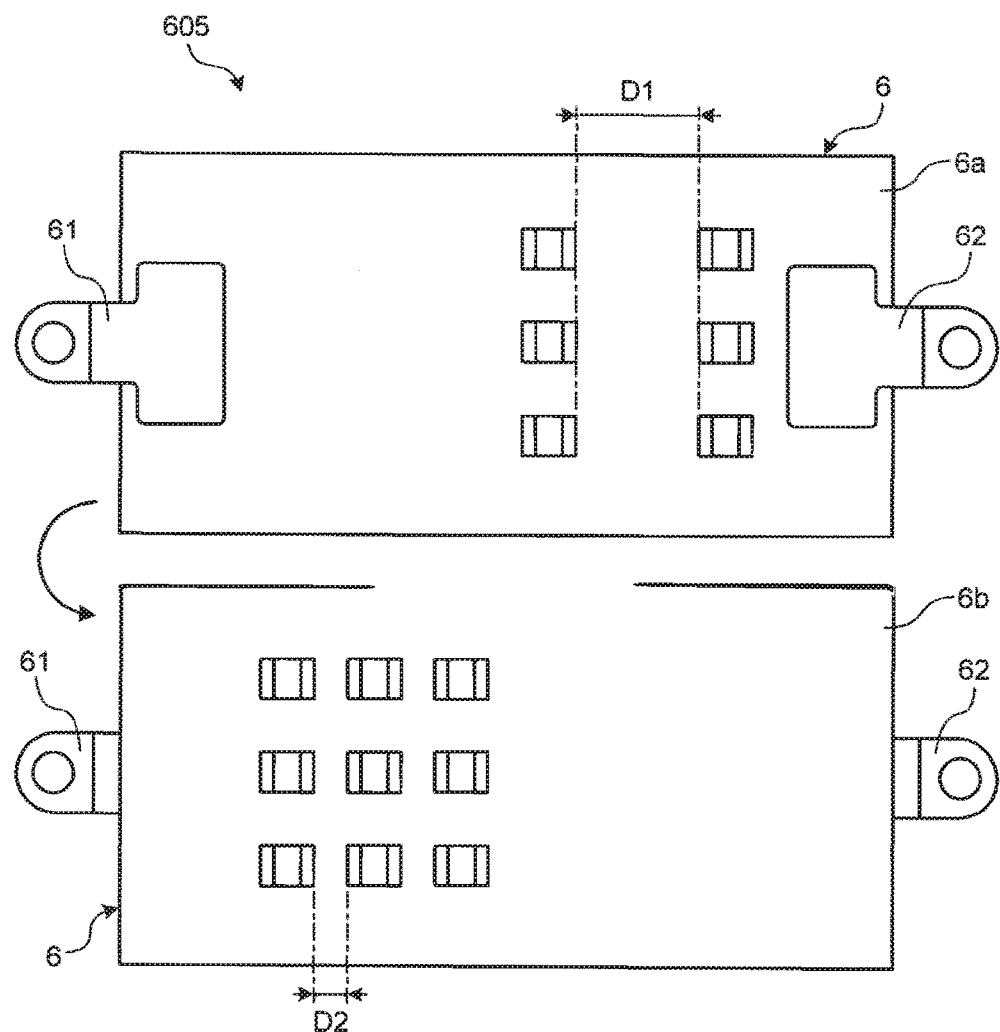
FIG. 17 is a schematic view illustrating schematically both surfaces of a substrate of a resonant capacitor module of a wireless power supply system according to a modification.

In a resonant capacitor module 605 according to a modification illustrated in FIG. 17, in the same manner as the resonant capacitor modules 305, 405, and 505, the capacitor element C in the first mounting surface 6a and the capacitor element C in the second mounting surface 6b are arranged so as not to be overlapped with each other on both surfaces of the substrate 6. In the resonant capacitor module 605 according to the present modification, the capacitor elements C in the first mounting surface 6a and the capacitor elements C in the second mounting surface 6b are arranged so as to be overall displaced each other in the long side direction of the substrate 6 on both surfaces of the substrate 6 and hence, the capacitor element C in the first mounting surface 6a and the capacitor element C in the second mounting surface 6b are arranged so as to be different in mounting position from each other and so as not to be overlapped with each other on both surfaces of the substrate 6.

Even in the power transmission device 2 and the power reception device 3 according to each modification explained heretofore, the capacitor elements C are mounted on the substrate 6 so as not to be overlapped with each other on both surfaces of the substrate 6 thus ensuring the space on the back side of each capacitor element C as a space for dissipating heat, and ensuring the heat dissipation of each capacitor element C. As a result, each of the power transmission device 2 and the power reception device 3 is capable of suppressing the heat accumulation thereof, and further improving the heat resistance performance thereof.

Here, the wireless transmission device according to each of the above-mentioned embodiments of the present invention is not limited to the above-mentioned embodiments, and various modifications can be made without departing from the gist of the descriptions in the claims.

Although the explanations have been made heretofore assuming that the wireless power supply system 1 including the wireless transmission device is mounted on a vehicle, the present embodiment is not limited to these examples.

Although the explanations have been made heretofore assuming that the resonant capacitor modules 5 arranged as above is applied to both of the power transmission device 2 and the power reception device 3, the present embodiment is not limited to these examples, and the resonant capacitor modules 5 may be applied to either one of the power transmission device 2 and the power reception device 3.

The connection relation among the capacitor elements C explained heretofore is not limited to the embodiments explained above.

Although the explanations have been made heretofore assuming that the connection terminal 61 and the connection terminal 62 are arranged on the respective short sides of the substrate 6 formed in a rectangular plate shape, and face each other in an opposed manner along the long side direction, the present embodiment is not limited to these examples. It is unnecessary for the connection terminal 61 and the connection terminal 62 to face each other in an opposed manner, the shape of the substrate 6 is not limited to the rectangular plate shape, and the substrate 6 may be formed in a circular plate shape, a triangular plate shape, or a polygonal plate shape having five or more sides. Furthermore, a distance between the capacitor elements C adjacent to each other may be increased in a step-like manner toward the connection terminal 62 side from the connection terminal 61 side.

The wireless transmission device according to the present embodiment includes the capacitor elements mounted on the substrate, and a distance between the capacitor elements arranged on the connection portion side of the substrate with the second electric wire that is relatively large in an amount of heat generation is larger than that arranged on the connection portion side of the substrate with the first electric wire, thus suppressing heat accumulation generated on the connection portion side of the substrate with the second electric wire. As a result, the wireless transmission device achieves the advantageous effect that heat resistance performance of the capacitor element can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless transmission device comprising:
 a coil configured to generate a magnetic field; and
 a resonant power storage element module electrically connected with the coil, capable of accumulating electric power, and configured to constitute a resonance circuit corresponding to a power transmission frequency in cooperation with the coil when transmitting the electric power via the coil, wherein
 the resonant power storage element module includes a substrate with which a first electric wire and a second electric wire that is larger in an amount of heat generation than that of the first electric wire at a time of energization are connected, and a plurality of power storage elements mounted on the substrate, and a distance between the power storage elements adjacent to each other on a side of a connection portion connected with the second electric wire in the substrate is larger than that on a side of a connection portion connected with the first electric wire in the substrate.

2. The wireless transmission device according to claim 1, wherein
 the resonant power storage element module includes a region where the power storage elements are not mounted, in a center of the substrate.

3. The wireless transmission device according to claim 1, wherein
 the resonant power storage element module mounts the power storage elements on a first mounting surface of the substrate and a second mounting surface on a back side of the first mounting surface, and the power storage elements on the first mounting surface and the power storage elements on the second mounting surface are arranged so as not to be overlapped with each other on both surfaces of the substrate.

4. The wireless transmission device according to claim 2, further comprising:
 a pillar arranged in the region where the power storage elements are not mounted in the substrate, and configured to reinforce a housing that accommodates the resonant power storage element module and the coil, wherein
 the pillar is composed of a material that is higher in thermal conductivity than that of the substrate.

* * * * *